US006247009B1

(12) United States Patent
Shiiyama et al.

(10) Patent No.: US 6,247,009 B1
(45) Date of Patent: Jun. 12, 2001

(54) IMAGE PROCESSING WITH SEARCHING OF IMAGE DATA

(75) Inventors: Hirotaka Shiiyama, Machida; Hiroshi Owada, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/038,695

(22) Filed: Mar. 9, 1998

(30) Foreign Application Priority Data

Mar. 10, 1997 (JP) .................................................. 9-055109
Apr. 24, 1997 (JP) .................................................. 9-107228

(51) Int. Cl.[7] ..................................................... G06F 17/30
(52) U.S. Cl. ...................... 707/3; 707/5; 707/7; 709/219; 345/326
(58) Field of Search ...................... 707/3, 7, 5; 709/219; 345/326

(56) References Cited

U.S. PATENT DOCUMENTS 4,907,188 * 3/1990 Suzuki et al. .
4,999,790 * 3/1991 Murayama et al. ..................... 707/3
5,220,625 * 6/1993 Hatakeyama et al. ............... 345/347
5,241,671 * 8/1993 Reed et al. .......................... 707/104
5,450,580 * 9/1995 Takada .................................... 707/5
5,465,353 * 11/1995 Hull et al. ............................... 707/5
5,546,578 * 8/1996 Takada .
5,579,471 * 11/1996 Barber et al. ........................ 345/326
5,598,557 * 1/1997 Doner et al. ............................ 707/5
5,737,533 * 4/1998 Hond ................................... 709/219
5,751,286 * 5/1998 Barber et al. ........................ 345/348
5,799,115 * 8/1998 Asano et al. ......................... 382/305
5,819,261 * 10/1998 Takahashi et al. ....................... 707/3
5,911,139 * 6/1999 Jain et al. ............................... 707/3
5,937,041 * 8/1999 Cardillo, IV et al. ............ 379/93.25

* cited by examiner

*Primary Examiner*—Kim Vu
*Assistant Examiner*—Jean Corrielus
(74) *Attorney, Agent, or Firm*—Fitzpatrick, Cella, Harper & Scinto

(57) ABSTRACT

Information indicating image data and the number of times (the number of votes) the image data was found upon search are managed in an image management unit in correspondence with each other in units of image data stored in an image storage unit. A search condition is input from a user interface, and image data matching the input search conditions are searched for. The numbers of votes for the obtained image data are acquired from the image management unit, and the obtained image data are sorted and displayed on a search result notifying unit on the basis of the acquired numbers of votes.

17 Claims, 8 Drawing Sheets

F I G. 1
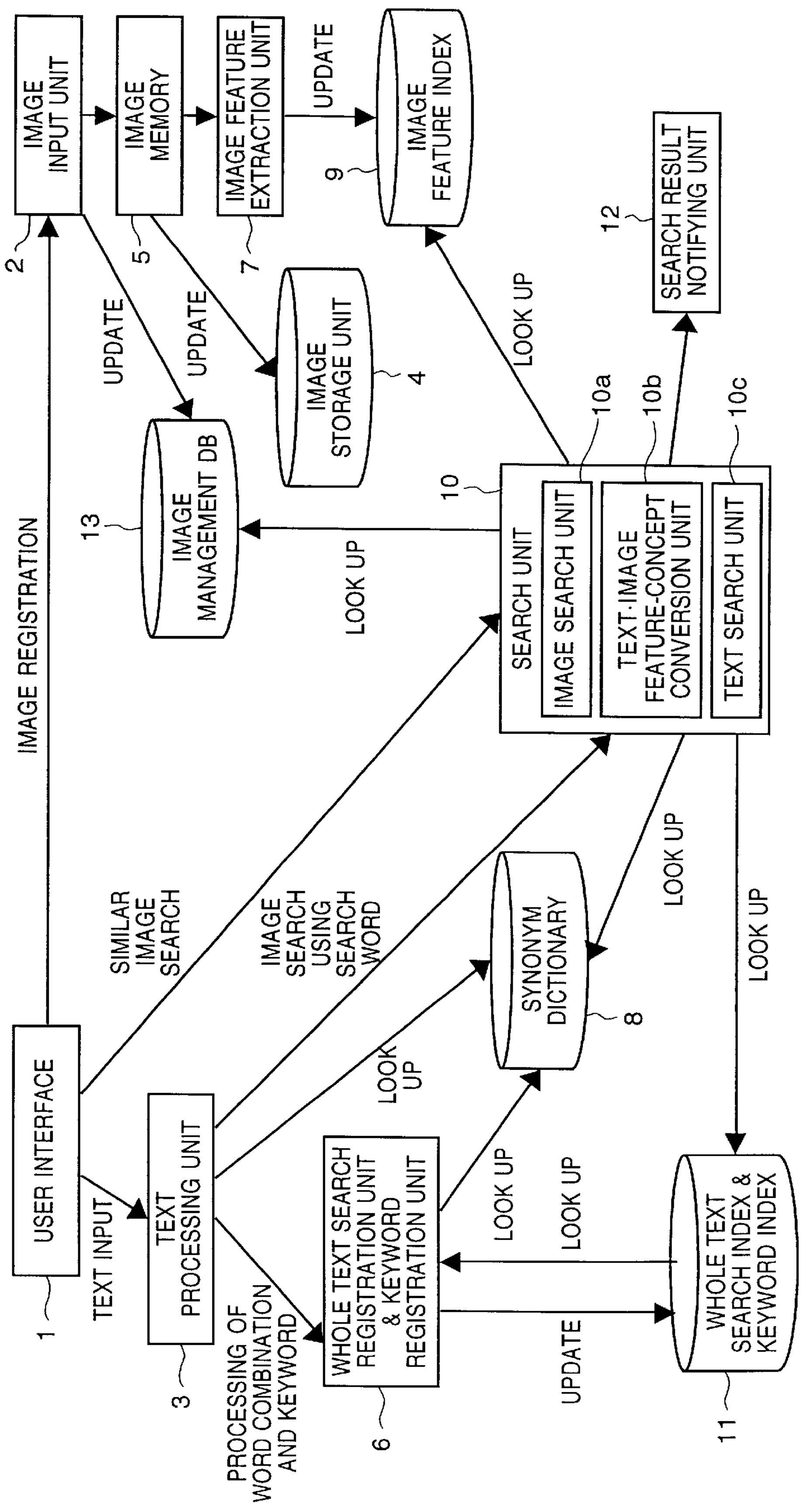

| 601 | 602 | 603 | 604 | 605 | 606 | 607 |
|---|---|---|---|---|---|---|
| IMAGE MANAGEMENT ID | NUMBER OF VOTES | STORAGE ADDRESS (FILE NAME WITH FULL PASS) | REGISTRATION DATA | CREATION TIME | IMAGE FEATURE 1 | IMAGE FEATURE 2 | ... |

| 701 | 702 | 703 | 704 | 705 | 706 |
|---|---|---|---|---|---|
| WORD | TOTAL NUMBER OF TIMES WORD WAS USED UPON SEARCH | IMAGE MANAGEMENT ID OF IMAGE A | NUMBER OF VOTES FOR IMAGE A | IMAGE MANAGEMENT ID OF IMAGE B | NUMBER OF VOTES FOR IMAGE B | ... |

IMAGE PROCESSING WITH SEARCHING OF IMAGE DATA

BACKGROUND OF THE INVENTION

The present invention relates to an image processing apparatus which manages a plurality of image data in an image storage unit, and searches for the image data managed in the image storage unit, and its control method.

Conventionally, when an image processing apparatus, which manages image data obtained by reading natural images using, e.g., a scanner, searches for image data, since it is hard to realize an image recognition technique for image data, a search directly using the image data cannot be made. For this reason, it is a common practice to add a word combination and keyword which indicate that image data upon reading image data, and to use the word combination and keyword added to the image data upon searching for image data. The search results of the image data are normally sorted and displayed in the order of attributes such as search matching rates, date, and the like obtained by the search.

However, in place of the sort & display function of the search results based on information inevitably encountered upon searching by the conventional image processing apparatus, a function that can sort and display search results on the basis of criteria that the many users show interest in, or by giving higher priority to frequently viewed images, i.e., on the basis of values added in the order that reflects the interests of the users, has been demanded.

SUMMARY OF THE INVENTION

The present invention has been made in consideration of the above-mentioned problems, and has as its object to provide an image processing apparatus, which can sort the search results of image data in the order that reflects the users' interests, and its control method.

In order to achieve the above object, an image processing apparatus according to the present invention comprises the following arrangement. That is, an image processing apparatus having a function of searching for image data, comprises:

voting means for allowing a searcher to vote for image data; and search means for searching for image data in accordance with a voting result at the voting means.

In order to achieve the above object, a control method for an image processing apparatus according to the present invention comprises the following arrangement. That is, a control method for an image processing apparatus having a function of searching for image data, comprises:

the voting step of allowing a searcher to vote for image data; and the search step of searching for image data in accordance with a voting result in the voting step.

In order to achieve the above object, an image processing apparatus according to the present invention comprises the following arrangement. That is, an image processing apparatus for managing a plurality of image data in an image storage unit, and searching for the image data managed in the image storage unit, comprises:

holding means for holding a management table which manages information indicating image data, and the number of times the image data was found upon search in correspondence with each other in units of image data managed in the image storage unit;

input means for inputting a search condition;

search means for searching for image data matching the search condition input by the input means; and display means for acquiring the numbers of times the image data was found upon search by the search means from the management table, and sorting and displaying the image data obtained by the search means on the basis of the acquired numbers of times the image data was found upon search.

Preferably, the holding means further holds an index for managing the total numbers of times of input of search conditions input by the input means in units of identical search conditions.

Preferably, the display means acquires the numbers of times the image data was found upon search by the search means from the management table, acquires the total number of times of input of the search condition, and sorts and displays the image data obtained by the search means on the basis of the acquired numbers of times the image data was found upon search and the total number of times of input.

Preferably, when the search condition is input by the input means, the display means displays a questionnaire window for acquiring information associated with a user.

Preferably, the input means comprises:

accept means for accepting replies of the user to the questionnaire window when the questionnaire window is displayed by the display means; and storage means for storing the replies of the user accepted by the accept means.

Preferably, contents of the questionnaire window include at least an age and hobby of the user.

Preferably, the display means sorts and displays the image data obtained by the search means on the basis of the replies of the user stored in the storage means.

In order to achieve the above object, a control method for an image processing apparatus according to the present invention comprises the following arrangement. That is, a control method for an image processing apparatus for managing a plurality of image data in an image storage unit, and searching for the image data managed in the image storage unit, comprises:

the holding step of holding a management table which manages information indicating image data, and the number of times the image data was found upon search in correspondence with each other in units of image data managed in the image storage unit;

the input step of inputting a search condition;

the search step of searching for image data matching the search condition input in the input step; and the display step of acquiring the numbers of times the image data was found upon search in the search step from the management table, and sorting and displaying the image data obtained in the search step on the basis of the acquired numbers of times the image data was found upon search.

In order to achieve the above object, a computer readable memory according to the present invention comprises the following arrangement. That is, a computer readable memory that stores a program code for controlling an image processing apparatus for managing a plurality of image data in an image storage unit, and searching for the image data managed in the image storage unit, comprises:

a program code of the holding step of holding a management table which manages information indicating image data, and the number of times the image data was found upon search in correspondence with each other in units of image data managed in the image storage unit;

a program code of the input step of inputting a search condition;

a program code of the search step of searching for image data matching the search condition input in the input step; and a program code of the display step of acquiring the numbers of times the image data was found upon search in the search step from the management table, and sorting and displaying the image data obtained in the search step on the basis of the acquired numbers of times the image data was found upon search.

As described above, according to the present invention, an image processing apparatus which can sort search results of image data in the order that reflects the users' interests, and its control method can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the arrangement of an image processing apparatus according to an embodiment of the present invention;

DESCRIPTION OF THE PREFERRED EMBODIMENTS

A method of sorting the search results of an image data search executed by an image processing apparatus of the present invention will be described below.

Prior to the description of the method, assume that this embodiment has a database for managing a plurality of images and storing vote results for the respective images, and a database for managing the current total number Vsum of votes cast for each image data. In this embodiment, when the user requests image display in an enlarged scale from thumbnail images as search results, it is determined that user has voted for that image. However, the present invention is not limited to such specific vote method. The record formats of the above-mentioned databases will be described in detail later with reference to FIGS. 6 and 7.

At the beginning of use, the numbers of votes cast of all the images are "0", and if search results are sorted depending on attributes such as registration dates and the like, the votes cast may be biased to sorted search results that come up first in the list. To prevent this, only at the beginning of use, image search results are randomly sorted until the vote tendency is settled.

Image data which has been just registered has a number of votes of "0", is hardly ranked high as a result of sorting, and the number of votes may stay small indefinitely. Hence, new image data are displayed as a list for a predetermined period of time, so that their numbers of votes assume significant values.

Figure 8:
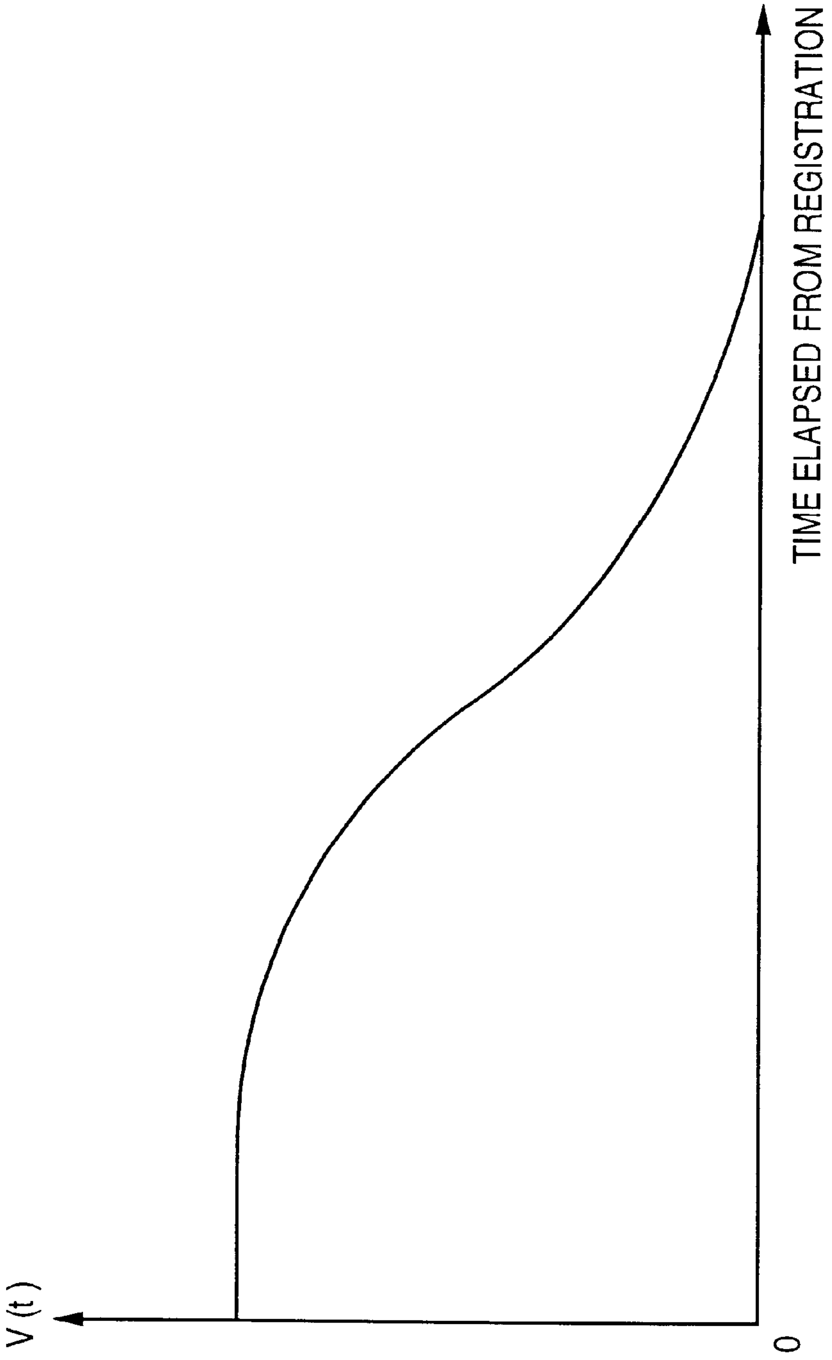
FIG. 8 is a graph showing an example of the characteristics of a function, the value of which decreases and asymptotically approaches zero along with passage of time.

Furthermore, in consideration of the time elapsed from the image registration date, a bias component of a search matching rate, which has characteristics in that the value decreases and asymptotically approaches zero along with passage of time, as shown in FIG. 8, is added to the search matching rate so as to set higher sort priority of a new image and to compensate for a small number of votes for the new registered image.

As such function, any functions may be used as long as they have characteristics in that the value decreases and asymptotically approaches zero along with passage of time, and let T(t) be such function for the sake of simplicity. Note that t is the time elapsed from registration.

A sort method that sorts in consideration of vote results will be explained below.

[Method 1]

A method of sorting search results in the order from those having larger numbers of users' votes upon displaying the search results of image data will be explained below.

When the method of adding a bias component of a search matching rate, which has characteristics in that the value decreases and asymptotically approaches zero along with passage of time, to the search matching rate is used, sorting is done based on evaluation values each obtained by adding the number of votes to the product of the function T(t) which is multiplied by a scaling factor.

Let VA be the number of votes for hit image A. Then, the evaluation value is given by:

$$\text{Evaluation value}=VA+\beta*T(t) \quad (1.0)$$

where $\beta$ is a constant satisfying $0<\beta$.

A search is done for images using the evaluation values, and all the hit images are sorted in the order from larger evaluation values.

[Method 2]

Let RA be the search matching rate of, e.g., image data A before a search, which is obtained as a search result of image data, VA be the number of users' votes for image data A (the number of users who conducted searches), and Vsum be the current total number of votes. Then, the evaluation value is calculated using equation (2.0) below. Note that α is a constant that satisfies 0<α.

$$\text{Evaluation value}=RA+\alpha*VA/V\text{sum} \quad (2.0)$$

The search results are sorted in accordance with the evaluation values. Note that the evaluation value calculated by equation (2.0) is obtained by converting the number of votes into an offset component of the search matching rate, and adding the offset component to the search matching rate before the search.

When the method of adding a bias component of a search matching rate, which has characteristics in that the value decreases and asymptotically approaches zero along with passage of time, to the search matching rate is used, sorting is done based on evaluation values each obtained by adding the number of votes to the product of the function T(t) which is muliplied by a scaling factor. Note that constants α and β respectively satisfy 0<α and 0<β.

$$\text{Evaluation value}=RA+\alpha*VA/V\text{sum}+\beta*T(t) \quad (2.1)$$

In this manner, search results are sorted in accordance with evaluation values each obtained by converting the number of votes and the time elapsed from registration into offset components of the search matching rate, and adding the offset components to the search matching rate value.

[Method 3]

Figure 7:
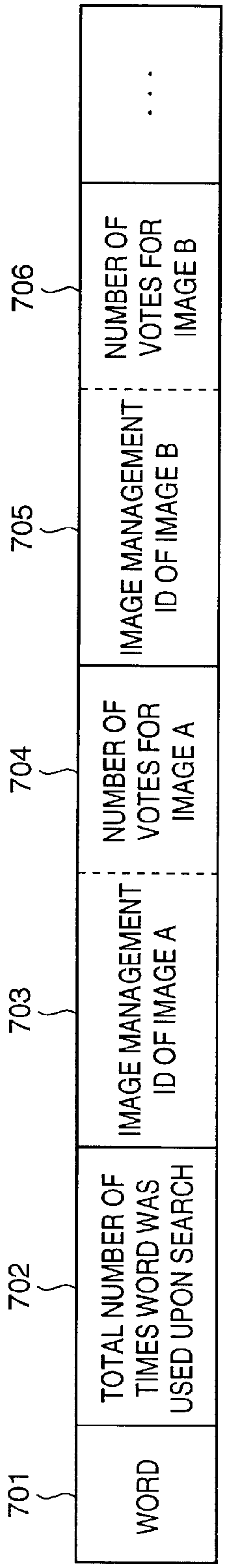
FIG. 7 shows an example of the record format of a whole text search index & keyword search index in the embodiment of the present invention.

When a search can be done using word combinations and keywords added to search image data, the search results of image data can be sorted as follows. As shown in FIG. 7, the total number of times a word was used in searches is managed in units of word combinations and keywords (words) added for a search. Also, an image data management ID indicating image data added with that word as a word combination and keyword and the number of users' votes are managed in units of image data.

If the search condition includes, e.g., word WORD1 alone, the numbers of votes of image data added with that word WORD1 in the word combinations and keywords is looked up, and the search results are sorted in the order from larger numbers of votes.

If the search condition includes, e.g., n words, i.e., words WORD1, WORD2, . . . , WORDn, the numbers of users' votes of all the image data that hit the individual words are added in units of image data to calculate the total numbers of votes, and the search results are sorted in the order from larger calculated numbers of votes.

When the method of adding a bias component of a search matching rate, which has time constant function characteristics in that the value decreases and asymptotically approaches zero along with passage of time, to the search matching rate is used, sorting is done based on evaluation values each obtained by adding the number of votes to the product of the function T(t) which is multiplied by a scaling factor. Note that i=1 to n, and a constant β satisfies 0<β. In this case, the evaluation value is given by:

$$\text{Evaluation value}=\sum_{i=1}^{n}\{PiV(i,A)\}+\beta*T(t) \quad (3.0)$$

In this manner, search results are sorted in accordance with evaluation values each obtained by converting the time elapsed from registration into an offset component of the search matching rate, and adding the offset component to the search matching rate value.

[Method 4]

As a modification of method 3 above, if the search condition includes, for example, n words, i.e., words WORD1, WORD2, . . . , WORDn, probabilities P1, P2, . . . , Pn that the individual words are used in searches, the numbers V(i, A) (for i=1, 2, . . . , n) of users' votes for these n words, and the search matching rate RA for image data A obtained as a search result are used to calculate the evaluation value by equation (4.0) below. Note that α is a constant that satisfies 0<α.

$$\text{Evaluation value}=RA+\alpha\sum_{i=1}^{n}\{PiV(i,A)\} \quad (4.0)$$

Then, search results are sorted in accordance with the evaluation values calculated by equation (4.0).

When the method of adding a bias component of a search matching rate, which has time constant function characteristics in that the value decreases and asymptotically approaches zero along with passage of time, to the search matching rate is used, sorting is done based on evaluation values each obtained by adding the number of votes to the product of the function T(t) which is muliplied by a scaling factor. Note that i=1 to n, and constants α and β respectively satisfy 0<α and 0<β. In this case, the evaluation value is given by:

$$\text{Evaluation value}=RA+\alpha\sum_{i=1}^{n}\{PiV(i,A)\}+\beta*T(t) \quad (4.1)$$

In this manner, search results are sorted in accordance with evaluation values each obtained by converting the number of votes and the time elapsed from registration into offset components of the search matching rate, and adding the offset components to the search matching rate value.

When grouping is to be realized, different image management DBs and whole text search indices are looked up depending on groups.

With any of the above-mentioned methods, a sort function that can preferentially learn image data that many users showed interest in or have viewed, can reflect them in search results, and can sort search results in the order that reflects the users' interests can be provided.

As an embodiment, image data search processing using, e.g., [method 4] as the search result sort method will be explained below.

The arrangement of an image processing apparatus according to an embodiment of the present invention will be described first with the aid of FIG. 1.

FIG. 1 is a block diagram showing the arrangement of the image processing apparatus according to the embodiment of the present invention.

In FIG. 1, reference numeral 1 denotes a user interface which includes a keyboard, mouse, and the like. Reference numeral 4 denotes an image storage unit which stores image data temporarily stored in an image memory 5. Reference numeral 2 denotes an image input unit which inputs image data to be registered in the image storage unit 4 in accordance with an instruction from the user interface 1.

Note that the image data used in this embodiment is assumed to be natural image data. However, the present invention is not limited to such specific image data, but may be applied to artificial image data such as CG data, CAD data, and the like.

Reference numeral 5 denotes an image memory for temporarily storing image data input by the image input unit 2.

Figure 6:
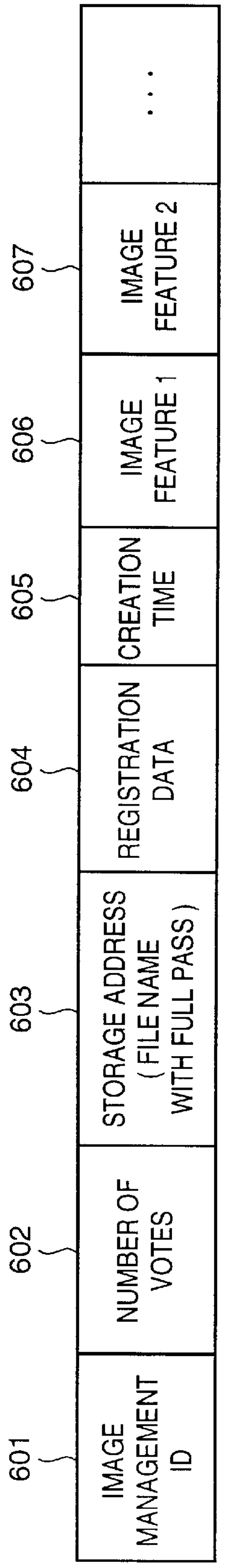
FIG. 6 shows an example of the record format of an image management DB in the embodiment of the present invention.

Reference numeral 7 denotes an image feature extraction unit for extracting an image feature amount used for searching for image data similar to the image data temporarily stored in the image memory 5. Reference numeral 9 denotes an image feature index, which registers the image feature amounts of image data extracted by the image feature extraction unit 7 in correspondence with that image data. Reference numeral 13 denotes an image management database (DB), which manages, as information associated with the obtained image, an image management ID 601, the number 602 of users' votes for that image data, the storage address 603 of that image data in the image storage unit 4, a registration date (or creation date) 604 of that image, a creation time 605, and image feature amounts 606 and 607, as shown in FIG. 6.

Reference numeral 3 denotes a text processing unit, which performs morphological analysis of the word combination and keyword, which are added to image data input from the image input unit 2 and indicate the contents of that image data, with reference to a synonym dictionary 8, if they are added, and outputs words obtained as a result of the analysis to a whole text search registration unit & keyword registration unit 6. When a search word used for searching for image data stored in the image storage unit 4 is input from the user interface 1, the text processing unit 3 outputs that search word to an image search unit 10.

Reference numeral 6 denotes a whole text search registration unit & keyword registration unit, which registers, as information associated with a word input from the text processing unit 3, for example, a word 701, the total number 702 of times the word was used in searches, an image management ID 703 of image data A to which that word is added as its word combination and keyword, the number 704 of users' votes for image data A, an image management ID 705 of image data B, the number 706 of users votes for image data B, and the like, as shown in FIG. 7, in a whole text search index & keyword search index 11. Reference numeral 8 denotes a synonym dictionary, which manages synonyms in units of their corresponding concepts. Note that the synonym dictionary 8 will be described in detail later.

Reference numeral 10 denotes a search unit which comprises an image search unit 10*a*, a text image feature-concept conversion unit 10*b*, and a text search unit 10*c*. The text search unit 10*c* performs a whole text search and keyword search with reference to the whole text index & keyword index 11 on the basis of the search word input from the text processing unit 3. The text image feature-concept conversion unit 10*b* acquires words corresponding to the search word with reference to the synonym dictionary 8, and calculates an image feature amount for obtaining similar image data to image data obtained by the text search unit 10*c*. The image search unit 10*a* searches an image feature index 9 for similar image data on the basis of the image feature amount calculated by the text image feature-concept conversion unit 10*b*. Also, the unit 10*a* searches the image feature index 9 for similar image data with reference on the basis of the image feature amount of image data designated at the user interface 1 of those displayed as search results on a search result notifying unit 12.

Reference numeral 12 denotes a search result notifying unit, which displays image data obtained as search results from the search unit 10.

An example of the detailed format of the synonym dictionary 8 of this embodiment will be described below with reference to FIG. 5.

Figure 5:
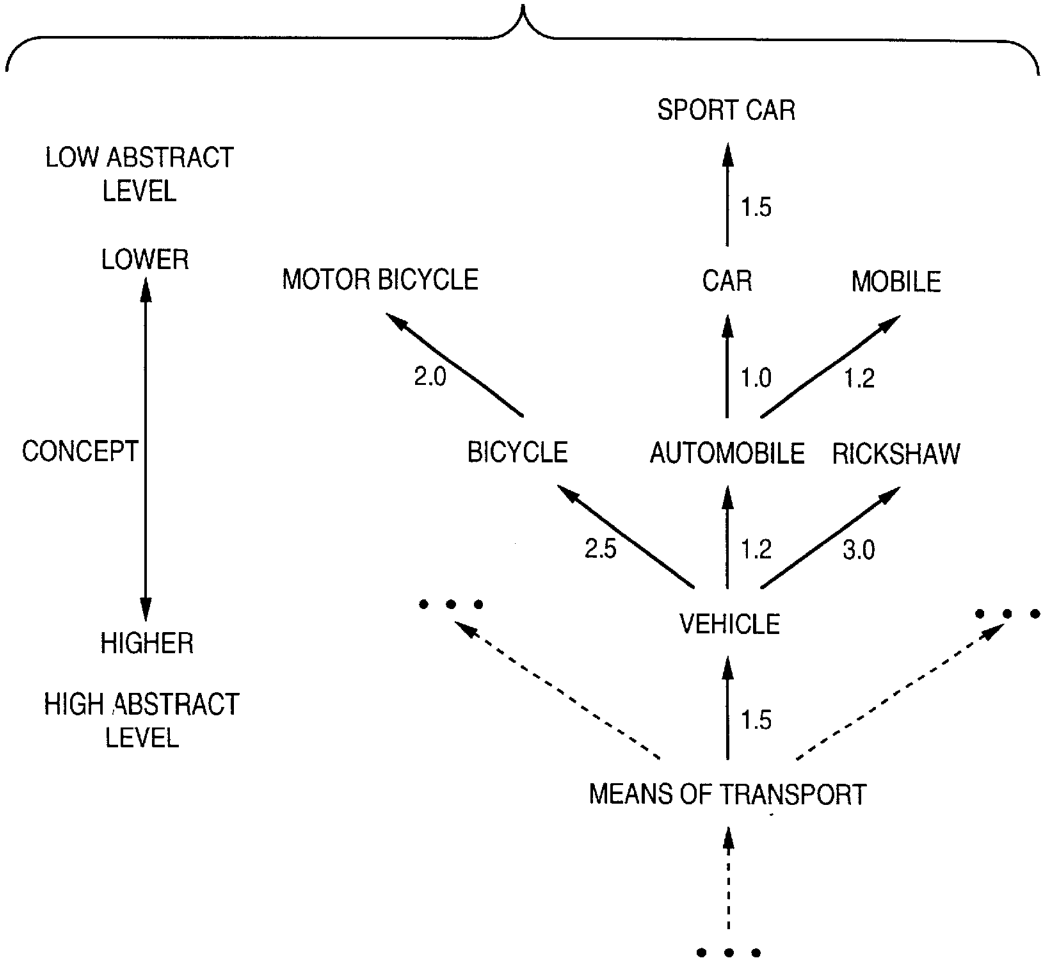
FIG. 5 shows an example of the detailed format of a synonym dictionary in the embodiment of the present invention.

FIG. 5 shows an example of the detailed format of the synonym dictionary according to the embodiment of the present invention.

The synonym dictionary 8 registers synonyms in correspondence with the abstract levels of the corresponding concepts. A conceptual distance representing the difference between abstract levels is defined between synonyms with different abstract levels of their concepts. For example, in FIG. 5, the conceptual distance between "automobile" and "vehicle" is 1.2. This conceptual distance is normalized. That is, if two synonyms have a conceptual distance of 1.0, they have the same meaning, and as the two synonyms have a larger conceptual distance, they have a larger difference in meaning between their concepts.

Image registration for registering image data executed in the image processing apparatus of this embodiment will be explained below with reference to FIG. 2.

Figure 2:
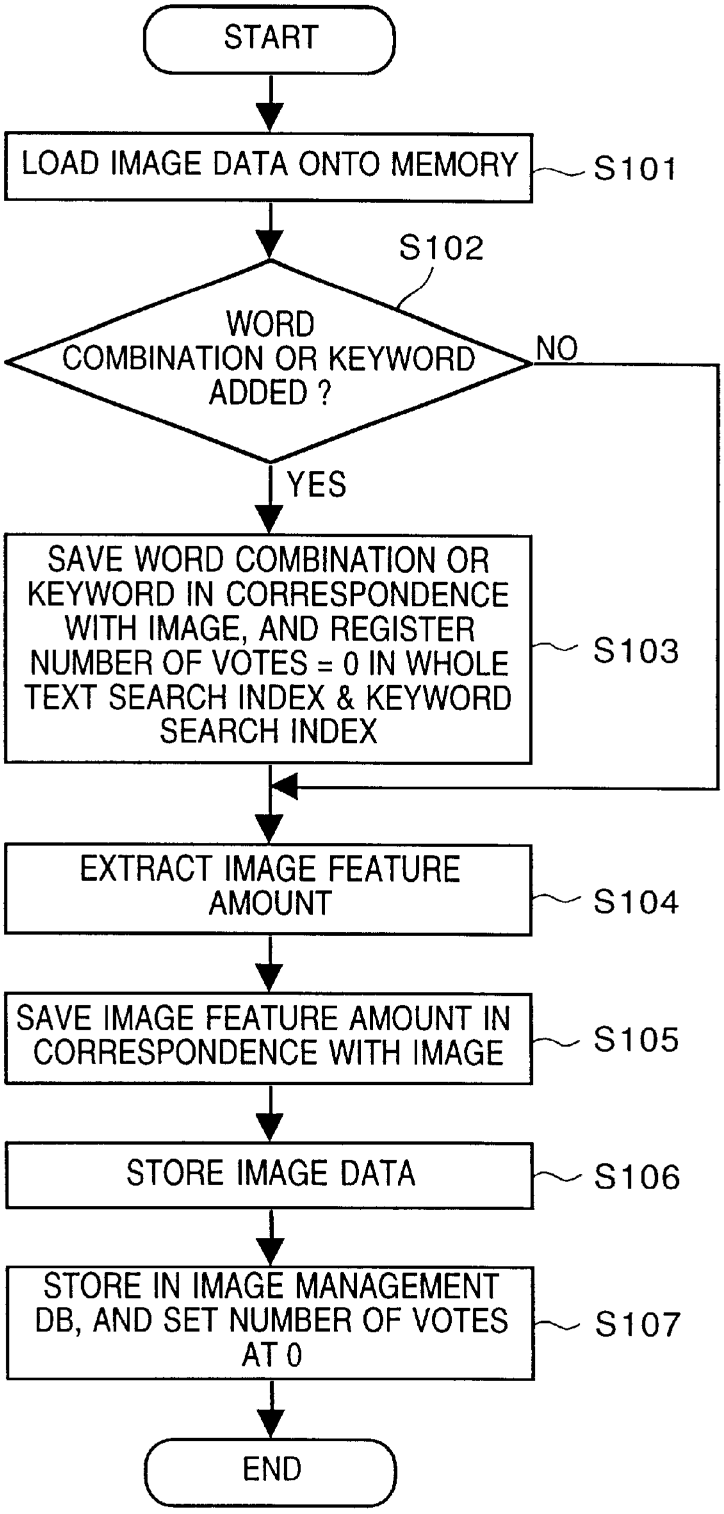
FIG. 2 is a flow chart showing the processing flow of image registration executed in the embodiment of the present invention.

FIG. 2 is a flow chart showing the processing flow of image registration executed in the embodiment of the present invention.

In step S101, image data to be registered is input from the image input unit 2, and is temporarily stored in the image memory 5. It is then checked in step S102 if a word combination or keyword for the input image data is added to that image data. If neither a word combination nor a keyword are added (NO in step S102), the flow jumps to step S104. On the other hand, if a word combination or keyword is added (YES in step S102), the flow advances to step S103.

In step S103, the word combination or keyword is registered in the whole text search index & keyword index 11 in correspondence with the input image data. Also, the number of users' votes of the image data added with the word combination or keyword is registered as "0". The whole text search index & keyword index 11 registers, in addition to a word indicating that word combination or keyword, the total number of times the word was used in searches, an image management ID indicating image data added with that word, and the number of users' votes for that image data, as described above.

In step S104, the image feature extraction unit 7 extracts the image feature amount of the image data. In step S105, the image feature amount extracted from the image data is registered in the image feature index 9 in correspondence with that image data. In step S106, the image data is stored in the image storage unit 4. In step S107, the storage address of the image data stored in the image storage unit 4, and an image management ID, creation date, creation time, extracted image feature amount, and the number of users' votes=0, which are used for managing that image data, are set in the image management DB 13.

When a plurality of typical, good sample image data (image data which are searched for at a predetermined frequency or higher) which may be frequently searched for are to be registered at the beginning of use, word combinations and keywords of the contents of these sample image data are registered. The added word combinations or keywords are registered in the whole text search index & keyword index 11 in correspondence with the sample image data. In order to search for similar image data, the image feature amounts of the sample image data are extracted, and are registered in the image feature index 9.

The search processing executed in the embodiment of the present invention will be described below. In the following description, two different search processing examples will be explained. In one search processing, the user selects image data similar to his or her desired image data, and searches for image data similar to the selected image data to obtain the desired image data (similar image search). In the other search processing, the user searches for desired image data using a word combination or keyword (whole text search and keyword search). Of these search processing examples, the image data search processing based on a similar image search will be explained first with reference to FIG. 3.

Figure 3:
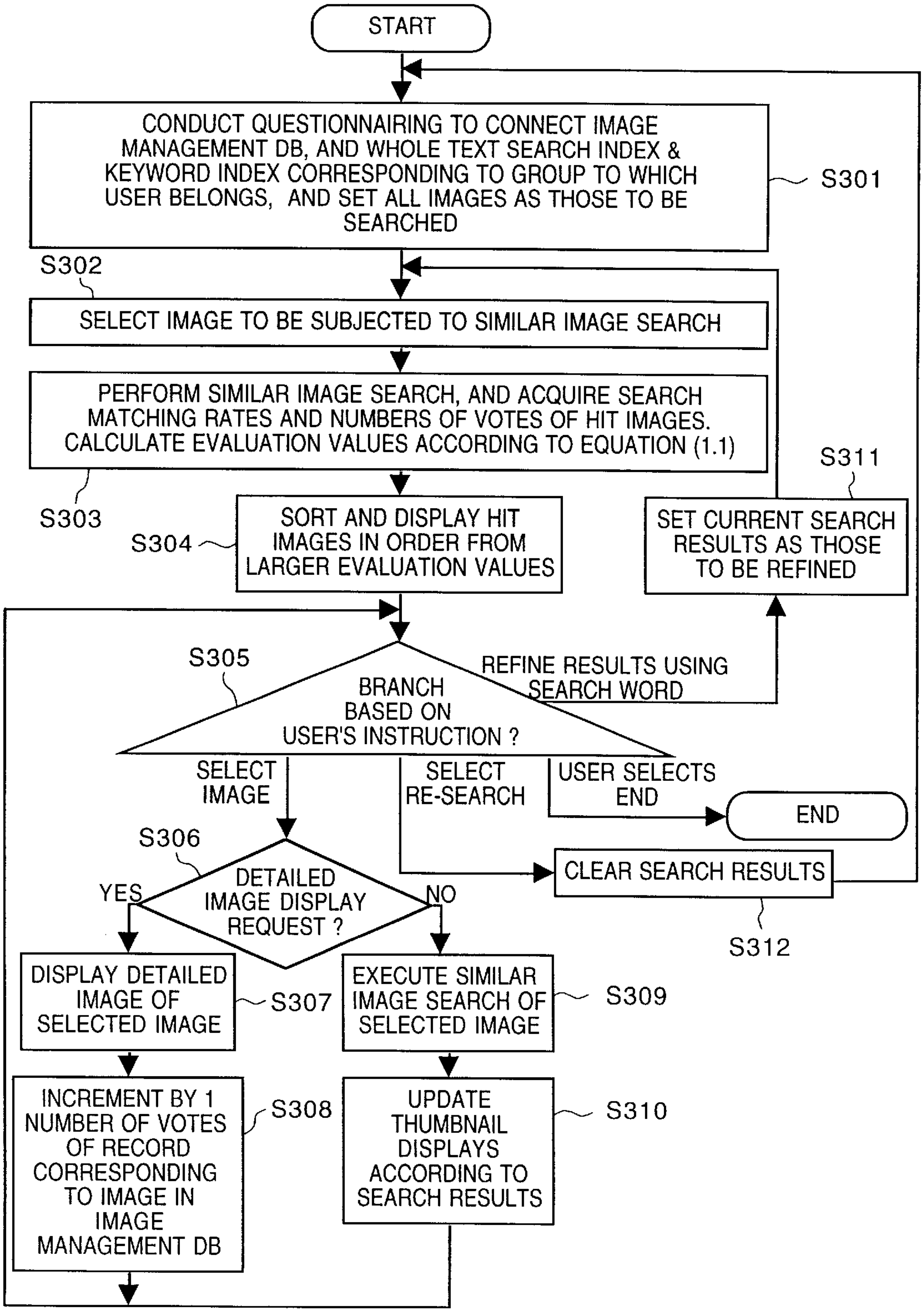
FIG. 3 is a flow chart showing the processing flow of a similar image search executed in the embodiment of the present invention.

FIG. 3 is a flow chart showing the processing flow of a similar image search executed in the embodiment of the present invention.

In step S301, prior to a similar image search, questionnairing is conducted for the user to determine the group to which desired image data belongs. In this questionnairing, the search result notifying unit 12 displays required questions for the user, and the user submits replies to those displayed questions via the user interface 1. The contents of the questionnaire include information about the age, hobby, occupation, and the like of the user. By registering such information, tendencies in units of users who have common information such as the age group, hobby, and the like, can be extracted. Also, as the sort condition of search results, search results are sorted on the basis of each group having a common tendency. In case of an image processing apparatus which requires an account for use of it in advance, the user need only submit replies to the questions once upon accounting. In this embodiment, the sort condition of search results based on the questionnaire is unconditional for the sake of simplicity.

Upon completion of questionnairing, all image data stored in the image storage unit 4 are set as image data to be searched.

In step S302, thumbnail images of set image data are displayed, and the user selects a thumbnail image similar to his or her desired image data. In step S303, the image feature amount of the image data selected by the user is acquired from the image management DB 13. The image feature index 9 is searched for similar image data to the selected image data on the basis of the acquired image feature amount. Subsequently, the search matching rates and the numbers of users' votes of the obtained image data are acquired. Evaluation values are calculated using equation (4.0) above based on the search matching rates and the numbers of users' votes, and the search results are sorted in the order from larger evaluation values. The sorted search results are displayed by the search result notifying unit 12 as thumbnail images.

If the search matching rates, the numbers of users' votes, and registration dates of the obtained image data are acquired in step S302, evaluation values are calculated using equation (4.1) above based on the acquired search matching rates, numbers of users' votes, and registration dates, and the search results are sorted in the order from larger evaluation values. The sorted search results are displayed by the search result notifying unit 12 as thumbnail images.

In step S305, the user's instruction for the search results is accepted.

If the user instructs to refine search results by selecting another image data, the user sets a message for conducting another search by refining the current search results at the user interface 1 in step S311. The flow then returns to step S302, and the user selects another image data. In this case, the currently obtained search results are held, and the search results of a similar image search using the newly selected image data, and the held search results are ANDed to refine the search results.

If the user's instruction indicates the end of search processing, the processing is to end.

If the user's instruction indicates a re-search, the search results are cleared in step S312, and the flow returns to step S301.

If the user's instruction selects image data from those displayed as the search results (i.e., image data displayed as thumbnails) to execute processing for the desired image data image, it is checked in step S306 if the processing for the selected image data is a display request of details (original-size image data) of that image data. If the processing is the display request of the details of the selected image (YES in step S306), the flow advances to step S307. In step S307, the details (original-size image data) of the selected image data (image data displayed as a thumbnail) is displayed. In step S308, the number of users' votes of the selected image stored in the image management DB 13 is incremented by 1.

On the other hand, if it is determined in step S306 that the processing is not a display request of the details of the selected image data (NO in step S306), the flow advances to step S309. In step S309, similar image data to the selected image data are searched for. In step S310, the currently displayed thumbnails of image data are updated in accordance with the obtained similar image data.

Subsequently, whole text search & keyword search processing which allows the user to search for desired image data using a word combination or keyword will be explained below with reference to FIG. 4.

Figure 4:
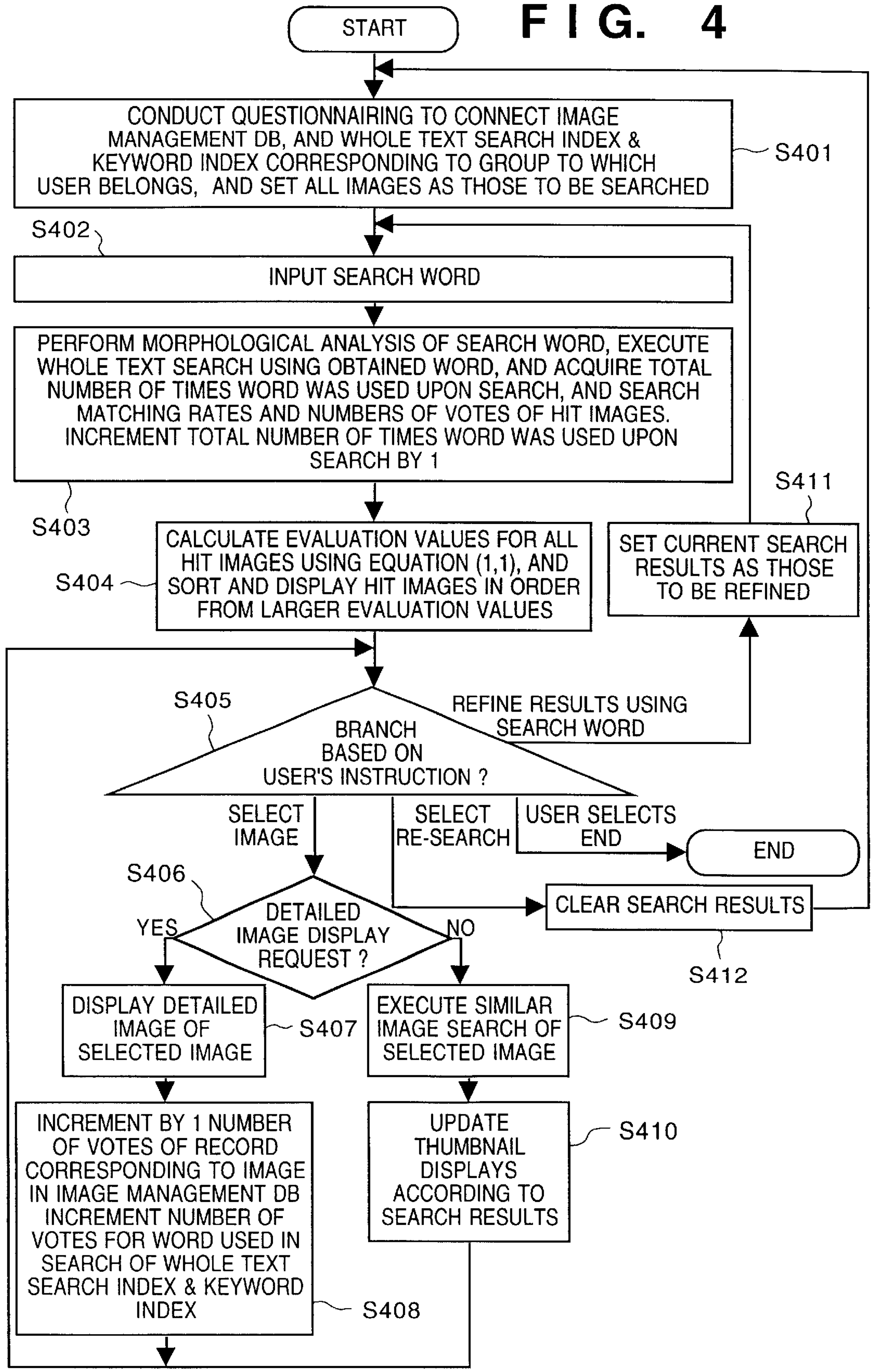
FIG. 4 is a flow chart showing the processing flow of a whole text search and keyword search executed in the embodiment of the present invention.

FIG. 4 is a flow chart showing the processing flow of a whole text search and keyboard search executed in the embodiment of the present invention.

In step S401, prior to a whole text search and keyword search, questionnairing is conducted for the user to determine the group to which desired image data belongs. Upon completion of the questionnairing, image data stored in the image storage unit 4 are set as those to be searched.

In step S402, the user inputs a search word as a search condition from the user interface 1. In step S403, morphological analysis of the input search word (word combination and keyword) is done, and a word as an analysis result is acquired. Based on the acquired word, a whole text search and keyword search are executed. If a plurality of words are acquired as a result of morphological analysis, a whole text search and keyword search are conducted on the basis of search conditions obtained by a predetermined logical operation. When image data are obtained by the whole text search and keyword search, the image management IDs and the numbers of users' votes of the obtained image data are acquired from the image management DB 13. Also, the total number of times of use in searches acquired. On the other hand, the total number of times the word was used in the whole text search and keyword search is acquired from the whole text search index & keyword index 11, and is incremented by 1.

In order to prevent search errors, a synonym of the word obtained as a result of morphological analysis of the search word may be acquired using the synonym dictionary 8 shown in FIG. 5, and another search may be done using a new search word obtained by ORing the acquired synonym and the original search word. In this case, a search matching rate y that satisfies the following equation is given to the conceptual distance of image data obtained as a result of the search using the original search word:

$y=f(x)$ y: search matching rate (%), x: conceptual distance f(x) is a monotonous decrease function of x, and a synonym satisfies f(x1)=100% for a conceptual distance x1.

For example, in the synonym dictionary shown in FIG. 5, images obtained using not a search word "automobile" but its synonym "car" are processed as those having a search matching rate of 1/1.0*100=100% since their conceptual distance is 1.0, i.e., these two words have exactly the same meaning. On the other hand, images obtained using not a search word "automobile" but its synonym "vehicle" are processed as those having a search matching rate of 1/1.2*100=83.3% since their conceptual distance is 1.2.

In step S404, evaluation values are calculated using equation (4.0) above based on the search matching rates and the numbers of users' votes, and the search results are sorted in the order from larger evaluation values. The sorted search results are displayed by the search result notifying unit 12 as thumbnail images. Alternatively, if the search matching rates, the numbers of users' votes, and registration dates are acquired, the evaluation values are calculated using equation (4.1) above based on the acquired search matching rates, numbers of users' votes, and registration dates, and the search results are sorted in the order from larger evaluation values. The sorted search results are displayed by the search result notifying unit 12 as thumbnail images.

In step S405, the user's instruction for the search results is accepted.

If the user instructs to refine search results by selecting another image data, the user sets a message for conducting another search by refining the current search results at the user interface 1 in step S411. The flow then returns to step S402, and the user inputs another search word. In this case, the currently obtained search results are held, and the search results of a whole text search & keyword search using the newly input search word, and the held search results are ANDed to refine the search results.

If the user's instruction indicates the end of search processing, the processing ends.

If the user's instruction indicates a re-search, the search results are cleared in step S412, and the flow returns to step S401.

If the user's instruction selects image data from those displayed as the search results (i.e., image data displayed as thumbnails) to execute processing for the desired image data image, it is checked in step S406 if the processing for the selected image data is a display request of details (original-size image data) of that image data. If the processing is a display request of the details of the selected image (YES in step S406), the flow advances to step S407. In step S407, the details (original-size image data) of the selected image data (image data displayed as a thumbnail) is displayed. In step S408, the number of users' votes of the selected image stored in the image management DB 13 is incremented by 1. Also, the number of votes of the word in the whole text search index & keyword index used in that search is incremented by 1.

On the other hand, if it is determined in step S406 that the processing is not a display request of the details of the selected image data (NO in step S406), the flow advances to step S409. In step S409, similar image data to the selected image data are searched for. In step S410, the currently displayed thumbnails of image data are updated in accordance with the obtained similar image data.

As described above, according to this embodiment, by managing the numbers of users votes of image data and search conditions associated with searches upon searching for image data, the search results of image data can be sorted and displayed on the basis of the managed numbers of votes. Hence, the search results of image data which have been sorted in the order that reflects the users' interests can be obtained.

More specifically, when a natural image is searched for using a conventional system, search results are displayed, and are sorted using the search matching rates and attributes such as dates, and the like. However, according to this embodiment, search results can be sorted to satisfy the psychological needs of users who want to view images that many users showed interest in or have viewed.

In this embodiment, when the user requests a display of the details of image data from those displayed as thumbnails as search results, the number of votes for that image data is acquired. However, the present invention is not limited to such specific arrangement. For example, the number of votes may be acquired at other timings, e.g., when thumbnail images are displayed.

The above embodiment has exemplified an image search. However, the present invention can be applied to sort methods of every data search results. Especially, the present invention can be applied to audio data.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the above-mentioned flow charts. This will be briefly explained below. That is, the storage medium stores modules shown in the memory map examples shown in FIGS. 9 and 10.

Figure 9:
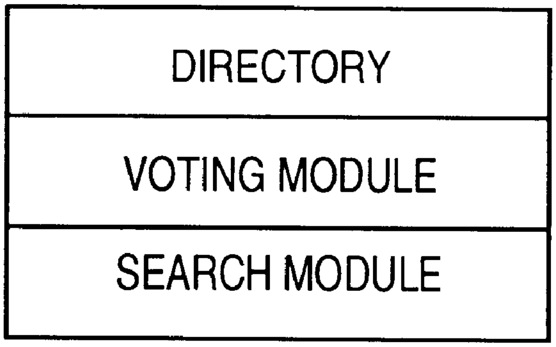
FIG. 9 shows the memory map structure of a storage medium that stores program codes for implementing the embodiment of the present invention.

More specifically, in the memory map example shown in FIG. 9, the storage medium need only store program codes of at least a "voting module" and "search module".

Note that the "voting module" allows a searcher to vote for image data. The "search module" searches for image data in accordance with the voting result.

Figure 10:
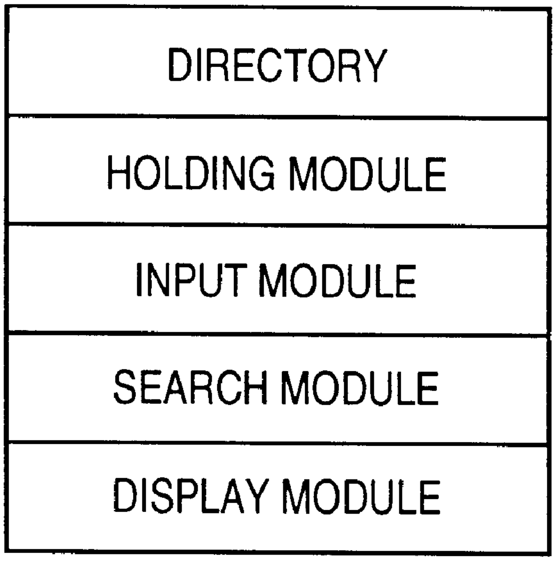
FIG. 10 shows the memory map structure of a storage medium that stores program codes for implementing the embodiment of the present invention.

On the other hand, in the memory map example shown in FIG. 10, the storage medium need only store program codes of at least a "holding module", "input module", "search module", and "display module".

Note that the "holding module" holds a management table that manages information indicating image data and the number of times the image data came up as a result of search in correspondence with each other in units of image data managed in the image storage unit. The "input module" inputs the search condition. The "search module" searches for image data matching the input search condition. The "display module" acquires the numbers of times the to-be-obtained image data came up upon search from the management table, and sorts and displays the obtained image data on the basis of the acquired numbers of times of search.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for managing a plurality of image data in an image storage unit, and searching for the image data managed in the image storage unit, comprising:

holding means for holding a management table which manages the number of votes corresponding to the number of times the image data was selected in correspondence with each other in units of image data managed in the image storage unit;

input means for inputting a search condition;

search means for searching for image data matching the search condition input by said input means; and display means for acquiring the numbers of votes corresponding to image data obtained by said search means from said management table, and sorting and displaying the image data obtained by said search means on the basis of the acquired numbers of votes.

2. The apparatus according to claim 1, wherein said holding means further holds an index for managing the total numbers of times of input of search conditions input by said input means in units of identical search conditions.

3. The apparatus according to claim 2, wherein said display means acquires the numbers of votes corresponding to image data obtained by said search means from said management table, acquires the total number of times of input of the search condition, and sorts and displays the image data obtained by said search means on the basis of the acquired numbers of votes and the total number of times of input.

4. The apparatus according to claim 3, wherein said holding means further holds management start dates in units of image data, and said display means sorts and displays the image data obtained by said search means on the basis of the numbers of votes, the total number of times input, and the management start dates.

5. The apparatus according to claim 1, wherein when the search condition is input by said input means, said display means displays a questionnaire window for acquiring information associated with a user.

6. The apparatus according to claim 5, wherein said input means comprises:

accept means for accepting replies of the user to the questionnaire window when the questionnaire window is displayed by said display means; and storage means for storing the replies of the user accepted by said accept means.

7. The apparatus according to claim 6, wherein contents of the questionnaire window include at least an age and hobby of the user.

8. The apparatus according to claim 7, wherein said display means sorts and displays the image data obtained by said search means on the basis of the replies of the user stored in said storage means.

9. A control method for an image processing apparatus for managing a plurality of image data in an image storage unit, and searching for the image data managed in the image storage unit, comprising:

a holding step, of holding a management table which manages the number of votes corresponding to the number of times the image data was selected in correspondence with each other in units of image data managed in the image storage unit;

a input step, of inputting a search condition;

a search step, of searching for image data matching the search condition input in the input step; and a display step, of acquiring the numbers of votes corresponding to image data obtained in said search step from said management table, and sorting and displaying the image data obtained in the search step on the basis of the acquired numbers of votes.

10. The method according to claim 9, wherein the holding step further includes the step of holding an index for managing the total numbers of times of input of search conditions input in the input step in units of identical search conditions.

11. The method according to claim 10, wherein the display step includes the steps of acquiring the numbers of votes corresponding to image data obtained in said search step from said management table, acquiring the total number of times of input of the search condition, and sorting and displaying the image data obtained in the search step on the basis of the acquired numbers of votes and the total number of times of input.

12. The method according to claim 11, wherein the holding step further includes the step of holding management start dates in unit of image data, and the display step includes the step of sorting and displaying the image data obtained in the search step on the basis of the numbers of votes, the total number of times of input, and the management start dates.

13. The method according to claim 9, wherein the display step includes the step of displaying a questionnaire window for acquiring information associated with a user when the search condition is input in the input means.

14. The method according to claim 13, wherein the input step comprises:

the accept step of accepting replies of the user to the questionnaire window when the questionnaire window is displayed in the display step; and the storage step of storing the replies of the user accepted in the accept step.

15. The method according to claim 14, wherein contents of the questionnaire window include at least an age and hobby of the user.

16. The method according to claim 14, wherein the display step includes the step of sorting and displaying the image data obtained in the search step on the basis of the replies of the user stored in the storage step.

17. A computer readable memory that stores a program code for controlling an image processing apparatus for managing a plurality of image data in an image storage unit, and searching for the image data managed in the image storage unit, comprising:

program code for a holding step of holding a management table which manages the number votes corresponding to the number of times the image data was selected in correspondence with each other in units of image data managed in the image storage unit;

program code for an input step of inputting a search condition;

program code for a search step of searching for image data matching the search condition input in the input step; and program code for a display step of acquiring the numbers of votes corresponding to image data obtained in said search step from said management table, and sorting and displaying the image data obtained in the search step on the basis of the acquired numbers of votes.

* * * * *

UNITED STATES PATENT AND TRADEMARK OFFICE

CERTIFICATE OF CORRECTION

PATENT NO. : 6,247,009 B1
DATED : June 12, 2001
INVENTOR(S) : Hirotaka Shiiyama et al.

It is certified that error appears in the above-identified patent and that said Letters Patent is hereby corrected as shown below:

<u>Column 4,</u>
Line 7, "that" should read -- that the --.

<u>Column 7,</u>
Line 34, "users" should read -- users' --;
Line 59, "users" should read -- users' --;

<u>Column 15,</u>
Line 5, "number" should read -- numbers of --.

Signed and Sealed this

Twenty-sixth Day of March, 2002

*Attest:*

JAMES E. ROGAN

*Attesting Officer* *Director of the United States Patent and Trademark Office*